(12) United States Patent
Buxton et al.

(10) Patent No.: US 7,610,448 B2
(45) Date of Patent: Oct. 27, 2009

(54) OBSCURING MEMORY ACCESS PATTERNS

(75) Inventors: Mark Buxton, Chandler, AZ (US);
Ernie Brickell, Portland, OR (US);
Quinn A. Jacobson, Sunnyvale, CA
(US); Hong Wang, Santa Clara, CA
(US); Baiju Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 11/646,642

(22) Filed: Dec. 27, 2006

(65) Prior Publication Data

US 2008/0162816 A1   Jul. 3, 2008

(51) Int. Cl.
G06F 12/00 (2006.01)
G06F 13/00 (2006.01)
G06F 13/28 (2006.01)
G06F 12/14 (2006.01)
G06F 11/00 (2006.01)
G06F 12/16 (2006.01)
G06F 15/18 (2006.01)
G08B 23/00 (2006.01)

(52) U.S. Cl. ........................ 711/118; 711/133; 711/144; 711/145; 726/22

(58) Field of Classification Search ................. 711/118
See application file for complete search history.

(56) References Cited

U.S. PATENT DOCUMENTS

| 6,026,471 | A | * | 2/2000 | Goodnow et al. ............ 711/137 |
| 6,418,542 | B1 | | 7/2002 | Yeager |
| 2003/0225976 | A1 | | 12/2003 | Hokenek et al. |
| 2007/0043916 | A1 | | 2/2007 | Aguilar, Jr. et al. |
| 2007/0277001 | A1 | * | 11/2007 | Mevergnies et al. ......... 711/145 |

FOREIGN PATENT DOCUMENTS

| EP | 1 347 384 A | 9/2003 |
| GB | 2 434 892 A | 8/2007 |
| WO | WO 03/054693 | 7/2003 |

OTHER PUBLICATIONS

EPO, European Application No. 07254933.0—1229 / 1939752, mailed Jan. 16, 2009, 6 pages.
EPO, European Application No. 07254933.0, dated Jul. 7, 2008, 1 page.
European Search Report dated May 28, 2008 for EP application No. 07254933.0. 5 pages.

* cited by examiner

*Primary Examiner*—Matt Kim
*Assistant Examiner*—Ralph A Verderamo, III
(74) *Attorney, Agent, or Firm*—Blakely, Sokoloff, Taylor & Zafman LLP

(57) ABSTRACT

For each memory location in a set of memory locations associated with a thread, setting an indication associated with the memory location to request a signal if data from the memory location is evicted from a cache; and in response to the signal, reloading the set of memory locations into the cache.

24 Claims, 4 Drawing Sheets

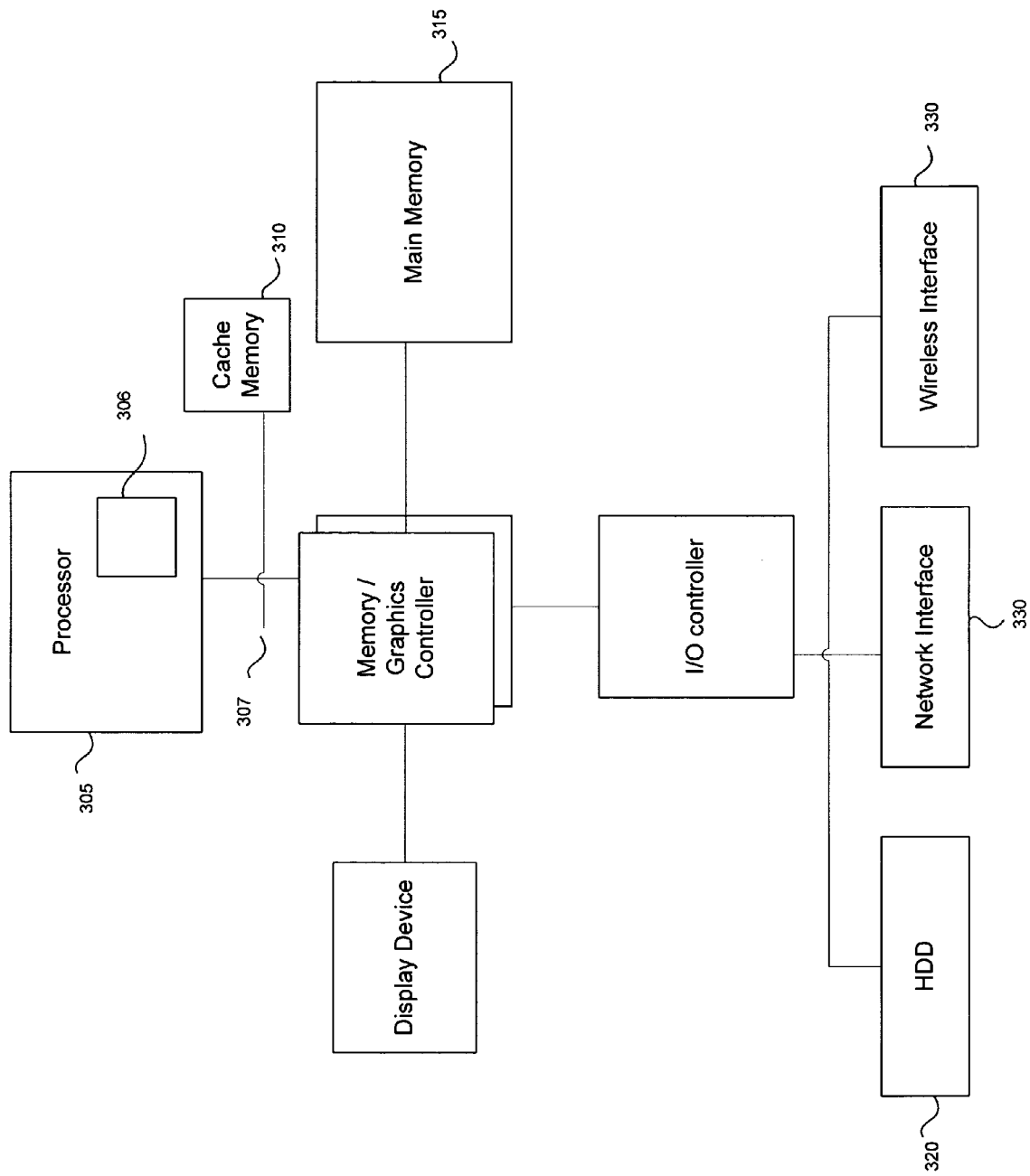
—Fig 3—

OBSCURING MEMORY ACCESS PATTERNS

CROSS-REFERENCE TO RELATED APPLICATION

The present application is related to pending U.S. patent application Ser. No. 11/349,661 entitled "TECHNIQUE FOR USING MEMORY ATTRIBUTES," and assigned to the assignee of the present invention and to U.S. patent application Ser. No. 11/513,871 entitled "METHOD AND APPARATUS FOR PREVENTING SOFTWARE SIDE CHANNEL ATTACKS," and assigned to the assignee of the present invention.

BACKGROUND

The access patterns of a program executing on a processor based system as the program accesses memory may inadvertently reveal private or sensitive information of the program. For example, the access patterns of an application encoding or decoding a secret cryptographic key may in some cases be used to determine the value of the bits in the key. Other exploits that use this type of information leakage may be readily envisaged.

In one specific instance, if two threads (also interchangeably termed "processes" in the context of this application) executing on a processor based system share a cache memory (cache), it is possible for one thread, a "spy" thread, to observe information about the access patterns of the other thread, a "target" thread. This is because the access patterns of the target thread can cause data of the spy thread to be evicted from cache memory, and can thus alter the access time of the spy thread's access of memory.

Depending on different processor architectures in processor based systems, the spy thread may achieve this type of information leak detection either temporally or spatially. In the temporal case, the spy thread and the target thread may run on a single processor and be interleaved in execution, sharing the single processor's cache. In the spatial case, the spy thread and target thread may run on different processors of a multi-processor system, or on different cores of a multi-core processor, but the spy thread may still achieve this type of detection if the two processors or cores share a common cache.

BRIEF DESCRIPTION OF THE DRAWINGS

FIG. 3 depicts a processor based system in one embodiment.

DETAILED DESCRIPTION

In one embodiment of the invention, memory attributes, (implemented, for example, as described in U.S. patent application Ser. No. 11/349,661 by Quinn et al., listed in the list of Cross Referenced Related Applications above), and associated with a particular segment, or "block", of memory may be used indicate various properties of the memory block. For example, in one embodiment, there are associated with each block of memory attribute bits that may be defined by a user to indicate any number of properties of the memory block with which they are associated, such as access rights. In one embodiment, each block of memory may correspond to a particular cache line, such as a cache line within a level one (L1) or level two (L2) cache memory, and the attributes are represented with bit storage locations located with or otherwise associated with a cache line. In other embodiments, a block of memory for which attributes may be associated may be a size larger or smaller than a cache line.

Figure 1:
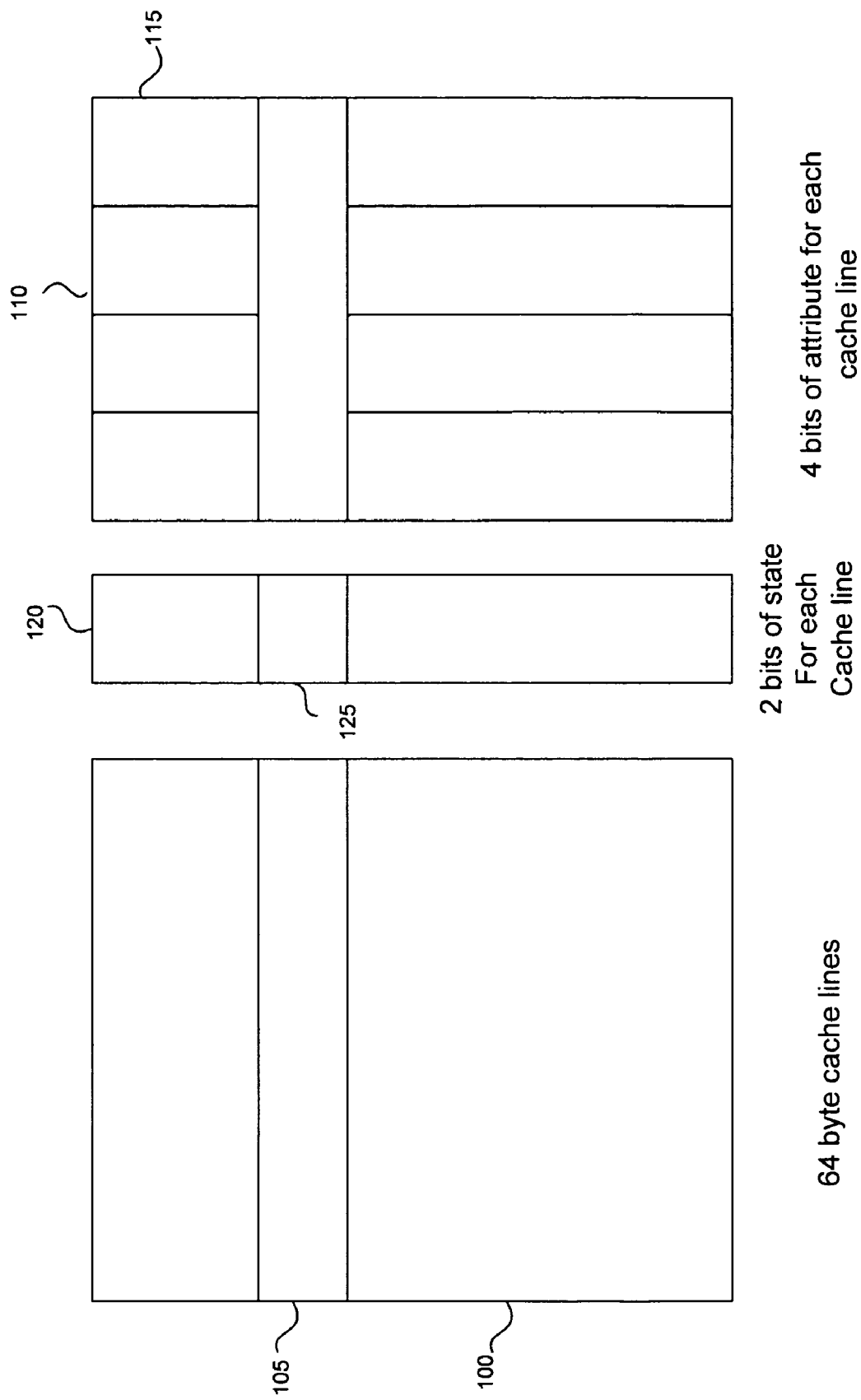
FIG. 1 depicts a cache memory in an embodiment.

FIG. 1 illustrates a portion of a cache memory, each cache line of which has an associated group of attribute bit storage locations, according to one embodiment of the invention. In particular, FIG. 1 illustrates a cache memory 100 including a cache line 105, which corresponds to a particular block of memory (not shown). The cache line 105 has associated therewith a number of attributes to be stored in the form of bits within storage location 110. Within the storage location 110 is a group of attribute bits 115 associated with cache line 105, which can store bits to represent various properties of the cache line, which can be used by a program executing on a processor based system that accesses the cache line.

In the embodiment illustrated in FIG. 1, the group of attribute bits contains four bits, which may represent one or more properties of the cache line, depending upon how the attribute bits are assigned. For example, in one embodiment, the attribute bits indicate that the program has recently checked that the block of memory is appropriate for the current portion of the program to access. In other embodiments, the attribute bits may indicate that the program has recorded a recent reference to this block of memory for later analysis by a performance monitoring tools, for example. In other embodiments, the attribute bits may designate other permissions, properties, etc.

In addition to the attribute bits, each line of cache may also have associated therewith a state value stored in state storage location 120. For example, in one embodiment the state storage location 120 contain state bits 125 associated with cache line 105 which designates whether the cache line is in a modified state, exclusively owned state, shared state, or invalid state. The state value can control whether various software threads, cores, or processors can use and/or modify information stored in the particular cache line. In some embodiments the state value is included in the attribute bits 115 for cache line 105.

In one embodiment of the invention, attributes associated with a block of memory may be accessed, modified, and otherwise controlled by specific operations, such as an instruction or micro-operation decoded from an instruction. For example, in one embodiment an instruction that both loads information from a cache line and sets the corresponding attribute bits (e.g., a "LOAD_SET" instruction) may be used. In other embodiments, an instruction that loads information from a cache line and checks the corresponding attribute bits (e.g., a "LOAD_CHECK" instruction) may be used in addition to a LOAD_SET instruction.

In still other embodiments, other instructions may be used to both control the attribute bits and access the corresponding cache data. For example, in one embodiment an instruction may be used that stores information to a cache line while either checking or setting (or both) the corresponding attribute bits (e.g., a "STORE_SET" and/or "STORE_CHECK" instruction). In some embodiments, instructions may be used to control or access the attribute bits that do not have an associated cache memory operation, such as load or store. For example, a "CLEAR_MAT" instruction that clears all attribute bits at a specified position (e.g. the third attribute bit for every line in the cache).

In the case of an instruction that checks the attributes associated with a cache line, one or more architectural scenarios within one or more processors or cores of a processor may be defined to perform certain events based on the attributes that are checked. There may be other types of events that can be performed in response to the attribute check. For example, in one embodiment, an architectural scenario may be defined to compare the attribute bits to a particular set of data and invoke an event based on the outcome of the compare. The event may, among other things, call a service routine which performs various operations in response to the scenario outcome before returning control to a thread or other process running in the system.

For example, one scenario that may be defined is one that invokes an event and corresponding handler upon detecting an Unexpected Memory State (UMS scenario). This may be useful if a thread or other process attempts to access a cache line expecting it to have a certain state, based on the attribute bits of the line, and instead the cache line is in another memory state, indicating that the cache line may no longer be associated with that particular thread or process. Another scenario that may be defined is one that invokes an event and corresponding handler upon detecting an invalidation of a cache line, either explicitly by a thread attempting to get ownership of the cache line in order to modify the content of the line or because the line got evicted by the cache management system in order to make room for other memory locations to be cached. This scenario is called the Memory Line Invalidate (MLI) scenario. This scenario may be useful for a thread to detect when a cache line previously allocated to a memory location of the thread has been evicted from the cache by a different thread. In some embodiments, other scenarios may be defined based on a check of cache line memory attributes. In other embodiments memory attributes of locations of finer granularity than the cache line may also be checked.

Figure 2A:
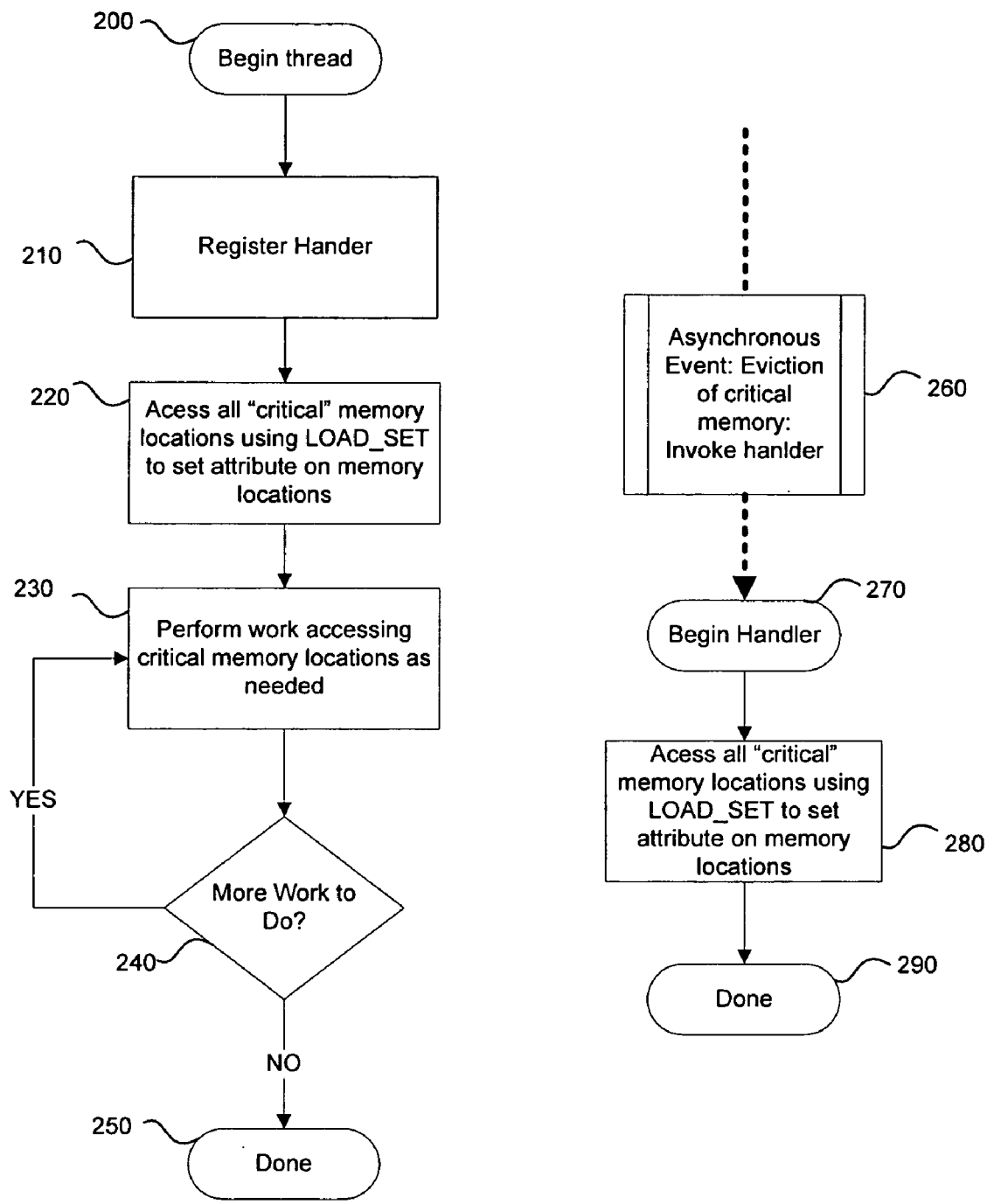
FIGS. 2a and 2b depict the flow of processing in one embodiment.

In one embodiment, functionality such as that described above or the equivalent may be used to obscure memory access patterns of a secure program or thread. In this embodiment, as depicted in FIG. 2a, a thread first identifies all memory locations or blocks of interest. These are termed "critical" memory locations because they may be critical to the security of the thread or to the secrecy of a the keys involved in an decryption or encryption process. However, any set of memory locations may be identified by a thread for any purpose. The exact method of identification of these memory locations depends on the purpose and implementation of the program of which the thread is a part, and is beyond the scope of this disclosure. When using this technology to protect the cryptographic algorithm, AES, from cache side channel attacks, the program would indicate the s-Box tables as the critical memory locations, since the access to these tables is dependent upon the secret key.

Once the set of memory locations or blocks is identified, and the thread begins execution at 200, it first registers a handler at 210 to respond to a Memory Line Invalidate (MLI) scenario in this embodiment. The thread then loads all the critical memory locations into the cache, 220, using a LOAD_SET or a similar instruction to set an attribute bit in association with each cache line into which a critical memory location is loaded. There are two methods for using this attribute set. In one embodiment, the attribute bit selected is set to indicate to the underlying processor or processor core that its logic should respond to an MLI scenario for that cache line. That is, in this instance, the invalidation of a cache line so marked will cause an event to be generated that results in the invocation of the thread's registered handler by the processor or processor core. In another embodiment, whenever a LOAD_CHECK instruction is executed, the processor checks that the attribute bit is set. If it is, then execution follows as normal. If it is not set, then a handler is called to reload all of the critical memory locations into the cache using a LOAD_SET or similar instruction.

The actual load of the critical memory locations at 220 by the thread is performed in a random or a predefined arbitrary order that is preferably unrelated to the actual order in which the memory locations are to be accessed by the thread. This is to prevent any type of information leakage relating to the order of cache loading from being useful to a spy thread that may be able to observe the order in which the cache is loaded.

The thread then begins the actual work, 230, that is to be performed with the memory locations. As indicated earlier, the exact work done by the thread may vary, depending on its purpose, and may include various types of cryptographic functionality involving the critical memory locations, or other actions that require secrecy and security from information leakage, among many other types of functionality. This process continues as long as more work remains to be accomplished, 240, and the thread then terminates 250.

If during the execution of the thread following the load of the critical memory locations at 220, an outside asynchronous event causes an eviction of any of the lines of the cache for which the attribute bit has been set by the thread, an MLI scenario is invoked at 260. This causes the logic of the underlying processor or core to transfer control to the handler previously registered by the thread at 210. The main function of the handler is to prevent a spy thread from using the cache walk technique described above or a similar technique to detect the memory access patterns of the thread. In this embodiment, this is accomplished by re-loading the critical memory locations of the thread in some arbitrary order or in some random order at 280. The handler then terminates, returning control to the thread sequencer. Thus, any previous attempt by a spy thread to pre-load the cache with its data and then observe the cache line loading pattern of the target thread that is performing a private function may be thwarted. This is because any attempt by the spy thread to displace any of the cache lines containing critical memory locations will cause all the lines to be re-installed in the cache, thus obscuring the actual access patterns of the target thread.

Figure 2B:
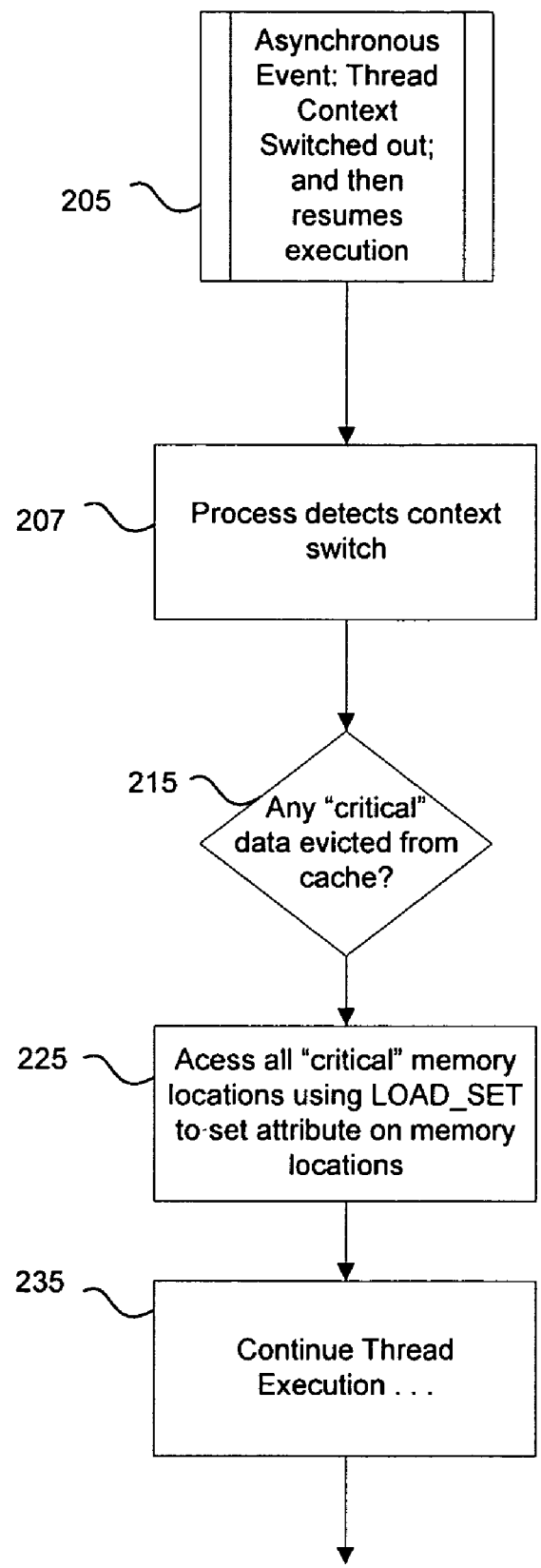

Further processing may be required if critical data is evicted from the cache when a thread is not executing because of a context switch. In one embodiment, for which additional processing is depicted in FIG. 2b, a mechanism may be used by a thread to detect that it has been context switched (one such mechanism is described in U.S. patent application Ser. No. 11/513,871 referenced above in the list of Cross-Referenced Related Applications, by McKeen, et al.). If a thread returns after a context switch, 205 and then the process detects that it has been context switched, 207, it may then check to see if any critical data was evicted during the time the thread was not executing, 215. If any data was evicted, the process may then perform a LOAD_SET on all of the critical data in its set, 225, and then continue execution. In some instances, a process may bypass the detection of data evictions at 215 and reload all critical memory locations into cache as at 225 after each context switch by default.

It should be understood that the processing in FIGS. 2a and 2b may coexist in an embodiment, thus allowing detection of data eviction during thread execution as in FIG. 2a, while also handling the possibility of data eviction during thread context switches, as in FIG. 2b.

In another embodiment for handling a context switch, all of the data access of the critical data is done with a LOAD_CHECK instruction. The MLI method may also be used. Then after a context switch, as soon as one LOAD is performed that accesses a cache line that was evicted when the process was not executing, all the critical data will be loaded.

In another embodiment, if the processor detects that there might have been a context switch, the processor may use a CLEAR_MAT or analogous instruction to clear all of memory attributes. In this way, no matter which data element is accessed after a context switch, the LOAD_CHECK instruction will trigger the handler to perform the LOAD_SET on all of the critical data in the set for the thread.

In other embodiments, many variations of the above described flow may occur. For example, the sequence of actions described as being executed by a handler thread (software) may alternatively be executed by logic of a processor or processor core in hardware. The exact nature of the attributes associated with cache lines may vary, for example in some embodiments only an attribute bit corresponding to the Memory Line Invalidate scenario may be present, and other attributes may or may not be present. Furthermore, attributes may be recorded as additional bits associated directly with lines in the cache, or in a separate register or other specialized memory. An MLI scenario may cause additional actions such as a logging action or a counter increment, among many others. The actual work performed by the handler that seeks to be protected may vary depending on its specific purpose. The manner of loading the critical memory locations into the cache may be different in the thread and the MLI scenario handler. Not all memory locations involved in a cryptographic operation may be deemed critical, and not all critical locations may have their attribute bit set in the cache in other embodiments. Many other variations are possible.

FIG. 3 illustrates a front-side-bus (FSB) computer system in which one embodiment of the invention may be used. A processor 305 accesses data from a level one (L1) cache memory 310 and main memory 315. In other embodiments of the invention, the cache memory may be a level two (L2) cache or other memory within a computer system memory hierarchy. Furthermore, in some embodiments, the computer system of FIG. 3 may contain both a L1 cache and an L2 cache.

Illustrated within the processor of FIG. 3 is a storage area 306 for machine state. In one embodiment storage area may be a set of registers, whereas in other embodiments the storage area may be other memory structures. The processor may have any number of processing cores. Other embodiments of the invention, however, may be implemented within other devices within the system, such as a separate bus agent, or distributed throughout the system in hardware, software, or some combination thereof.

The main memory 315 may be implemented in various memory sources, such as dynamic random-access memory (DRAM), a hard disk drive (HDD) 320, or a memory source located remotely from the computer system via network interface 330 containing various storage devices and technologies. The cache memory may be located either within the processor or in close proximity to the processor, such as on the processor's local bus 307.

Furthermore, the cache memory may contain relatively fast memory cells, such as a six-transistor (6T) cell, or other memory cell of approximately equal or faster access speed. The computer system of FIG. 3 may be a point-to-point (PtP) network of bus agents, such as microprocessors, that communicate via bus signals dedicated to each agent on the PtP network.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. A method comprising
   for each memory location in a set of memory locations associated with a thread, setting an indication associated with the memory location to request a signal if data from the memory location is evicted from a cache; and
   in response to the signal, reloading the set of memory locations into the cache.

2. The method of claim 1 further comprising loading the set of memory locations into the cache in at least one of
   a random order; and
   a predetermined order.

3. The method of claim 1 wherein the signal further comprises an interrupt, the method further comprising registering a handler to respond to the signal.

4. The method of claim 1 wherein the set of memory locations further comprises a set of memory locations having data, at least in part, private to the thread.

5. The method of claim 2 wherein the signal comprises an interrupt, and wherein reloading the memory locations into the cache further comprises logic of a processor reloading the set of memory locations into the cache in at least one of
   a random order; and
   a predetermined order.

6. The method of claim 3 wherein reloading the set of memory locations into the cache further comprises the handler reloading the set of memory locations into the cache in at least one of
   a random order; and
   a predetermined order.

7. The method of claim 3 wherein setting the indication associated with the memory location further comprises setting an attribute bit associated with the cache line of the data from the memory location to a predetermined value, the method further comprising logic of a processor detecting the eviction of data from the memory location from the cache and generating the interrupt.

8. The method of claim 1 further comprising the thread detecting that the thread has resumed execution following a context switch and the thread reloading the set of memory locations into the cache at least in part in response to the detecting.

9. A system comprising
   a processor;
   a memory communicatively coupled with the processor, further comprising a program thread (thread), where for each memory location in a set of memory locations associated with the thread, the thread is to set an indication associated with the memory location to request a signal if data from the memory location is evicted from a cache; and
   in response to the signal, to reload the set of memory locations into the cache.

10. The system of claim 9 wherein the thread is further to load the set of memory locations into the cache in at least one of
    a random order; and
    a predetermined order.

11. The system of claim 9 wherein the signal further comprises an interrupt, the thread further to register a handler to respond to the signal.

12. The system of claim 9 wherein the set of memory locations further comprises a set of memory locations having data, at least in part, private to the thread.

13. The system of claim 10 wherein the signal comprises an interrupt, and wherein reloading the set of memory locations into the cache further comprises logic of a processor reloading the set of memory locations into the cache in at least one of
    a random order; and
    a predetermined order.

14. The system of claim 11 wherein reloading the set of memory locations into the cache further comprises the handler reloading the set of memory locations into the cache in at least one of
    a random order; and
    a predetermined order.

15. The system of claim 11 wherein setting the indication associated with the memory location further comprises setting an attribute bit associated with the cache line of the data from the memory location to a predetermined value, and wherein the system further comprises logic to detect the eviction of data from the memory location from the cache and to generate the interrupt.

16. The system of claim 9 wherein the thread is further to detect that the thread has resumed execution following a context switch and the to reload the set of memory locations into the cache at least in part in response to the detecting.

17. A tangible machine readable medium having stored thereon data that when accessed by a machine causes it to perform a method, the method comprising
    for each memory location in a set of memory locations associated with a thread, setting an indication associated with the memory location to request a signal if data from the memory location is evicted from a cache; and
    in response to the signal, reloading the set of memory locations into the cache.

18. The machine readable medium of claim 17 wherein the method further comprises loading the set of memory locations into the cache in at least one of
    a random order; and
    a predetermined order.

19. The machine readable medium of claim 17 wherein the signal further comprises an interrupt, the method further comprising registering a handler to respond to the signal.

20. The machine readable medium of claim 17 wherein the set of memory locations further comprises a set of memory locations having data, at least in part, private to the thread.

21. The machine readable medium of claim 18 wherein the signal comprises an interrupt, and wherein reloading the set of memory locations into the cache further comprises logic of a processor reloading the set of memory locations into the cache in at least one of a random order; and a predetermined order.

22. The machine readable medium of claim 19 wherein reloading the set of memory locations into the cache further comprises the handler reloading the set of memory locations into the cache in at least one of a random order; and a predetermined order.

23. The machine readable medium of claim 19 wherein setting the indication associated with the memory location further comprises setting an attribute bit associated with the cache line of the data from the memory location to a predetermined value, the method further comprising logic of a processor detecting the eviction of data from the memory location from the cache and generating the interrupt.

24. The machine readable medium of claim 19 wherein the method further comprises the thread detecting that the thread has resumed execution following a context switch and the thread reloading the set of memory locations into the cache at least in part in response to the detecting.

\* \* \* \* \*